Figure 1:
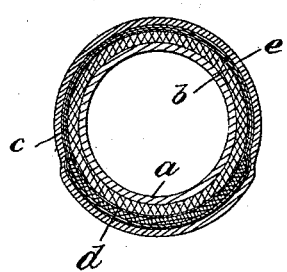

(No Model.)

J. R. MORRIS.
SELF HEALING PNEUMATIC TIRE.

No. 496,527. Patented May 2, 1893.

Attest:
Arthur A. Orb.
Reeve Lewis.

Inventor:
James R. Morris
by
his attorneys.

UNITED STATES PATENT OFFICE.

JAMES R. MORRIS, OF PASSAIC, NEW JERSEY, ASSIGNOR TO THE NEW YORK BELTING AND PACKING COMPANY, LIMITED, OF ENGLAND.

SELF-HEALING PNEUMATIC TIRE.

SPECIFICATION forming part of Letters Patent No. 496,527, dated May 2, 1893.

Application filed October 15, 1892. Serial No. 449,004. (No model.)

*To all whom it may concern:*

Be it known that I, JAMES R. MORRIS, of the city and county of Passaic, in the State of New Jersey, have invented a new and useful Improvement in Self-Healing Pneumatic Tires, which invention is fully set forth in the following specification.

The object of this invention is to cause pneumatic or inflated rubber tires for the wheels of bicycles and other vehicles, to be self-healing. A self-healing pneumatic tire is one that will not leak on being pierced or punctured by accident under the ordinary conditions to which such tires are subjected when in use. Inflated rubber tires are so well known that their general structure needs no special description.

My invention consists in a mode of using unvulcanized india rubber in the structure of the tire. This unvulcanized rubber is softer and more sticky than vulcanized rubber. I prefer for this purpose to use a mixture of Assam rubber and Para rubber. Assam rubber serves to give the desired softness and stickiness to the unvulcanized rubber portion of the tire. When a piece of glass or nail or other similar substance is encountered by the tire when in use and the same pierces the tire, it either remains in the tire or becomes withdrawn. If it remains in the tire, in passing through the soft unvulcanized rubber, contact is so close as to prevent the leakage of air while if the foreign substance is withdrawn the softness of the rubber causes it to immediately close the hole and thus the tire is kept air tight. The air pressure within serves to close the aperture and prevents the collapse of the tire.

I will now proceed to describe the construction of a self-healing pneumatic tire embracing my improvement. Pneumatic tires are tubes made of india rubber, or layers of canvas coated with india rubber, or of layers of rubber combined with layers of canvas.

In describing my structure I will begin at the inside of the tube and describe the successive layers from the inside of the tube outwardly. The inner layer of the tire is composed of a layer or tube of vulcanized india rubber. Next to that is a layer or tube of unvulcanized india rubber. Next to that, on the portion of the tire which is opposite to and does not include the tread portion of the tire, are three plies of cloth, preferably fine ⟨S⟩ sheeting, frictioned or coated with india rubber. The innermost of these plies of cloth extends all around in contact with the above described layer or tube which is next within it, but the other two plies are separated from the innermost ply at each side of the tread portion of the tire, and between these two outer plies and the one inner ply, is inserted a sheet or layer of unvulcanized rubber which protects and covers the whole tread portion of the tire and which causes it to bulge to some extent in accordance with its thickness. This mass of unvulcanized rubber is firmly inclosed in the space thus formed by the separation of the plies of cloth, the plies of cloth being firmly secured at their point of separation by rubber cement or otherwise, in order to prevent their being further torn apart. Thus a receptacle or case is made for this piece of unvulcanized rubber, which will prevent it from spreading or separating. Next outside of the three plies of cloth, or to speak more accurately, next outside of the two plies of cloth, which are co-extensive with the tread portion of the tire, and the three plies of cloth which are co-extensive with the rest of the tire, is a layer of vulcanized india rubber. On the outside of all, is what is known to manufacturers of such tires as a protection strip, which is a layer of vulcanized rubber, about three-sixteenths of an inch thick, at the tread portion, and about one-sixteenth of an inch thick at the opposite portion or part of the tire, which is in contact with the felly of the wheel. All these several parts may be made before vulcanization and may be heated while together, several layers being united by rubber cement, or in some other suitable way.

An equally good method of constructing the self-healing tire is as follows: The inner layer is of unvulcanized rubber, the next layer is of vulcanized rubber, and the next layer consists of one ply of sheeting as before extending all around. On the outside of the single ply of sheeting covering the tread portion only, is a layer of unvulcanized rubber as before, and outside of that and around the single ply of sheeting last-mentioned, extend two plies of sheeting, all around the tube, thus making two plies of sheeting outside of the unvulcanized rubber that is co-extensive with the tread portion, and three plies of sheeting together on the opposite side of the tire, this part of the construction being the same as before described. Outside of the outer ply of sheeting is a layer or tube of vulcanized rubber and outside of all is the protection strip as before.

Another improvement in the construction of tires of the description last-mentioned, where the innermost layer is of unvulcanized rubber, consists in the addition of a layer of cloth inside of the innermost layer of unvulcanized rubber, the cloth thus forming the innermost tube of the entire structure. The cloth used for this purpose should be loosely woven so as to be flexible and capable of easy movement among its threads, otherwise such a layer of cloth will impair the self-healing quality of the tire. Jute cloth is suitable for this purpose. The cloth should be secured to the layer or tube with which it is in contact by means of rubber cement or by vulcanization or in any other suitable way.

Figure 2:
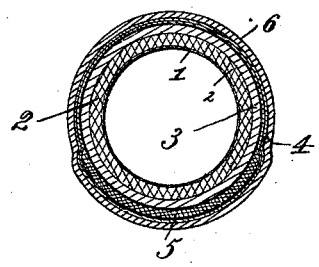

In the drawings, Figure 1, represents a cross-section of a cycle tire, constructed according to my invention, when made in the manner first described, and Fig. 2, represents a cross-section of the tire when made in the manner secondly above described, with the addition of the layer of cloth on the inside of the innermost layer of unvulcanized rubber.

In Fig. 1, $a$ represents the inner layer of vulcanized india rubber. $b$ represents the next layer of unvulcanized india rubber. $c$ represents the plies of cloth. $d$ represents the layer of unvulcanized rubber which protects and covers the tread portion of the tire, and which is inclosed in the space formed by the separation of the plies of cloth. $e$ represents the layer of vulcanized india rubber outside of the cloth. The protection strip is not represented, as it is common to all tires of this description.

In Fig. 2, 1 represents the layer of cloth on the innermost side of the tube. 2 represents the inner layer of unvulcanized rubber. 3 represents the next layer of vulcanized rubber. 4 represents the layers of sheeting. 5 represents the layer of unvulcanized rubber inclosed within the space caused by the separation of the plies of sheeting. 6 represents the next layer or tube of vulcanized rubber. The protection strip is not represented, it being common to all tires of this description.

When the unvulcanized rubber is comparatively soft there is a great advantage in inclosing it in the manner substantially as above shown. The unvulcanized rubber is kept in that state during the heating, from the fact that it is not combined with sulphur, the omission of that substance making it incapable of vulcanization.

I have mentioned unvulcanized rubber as a substance which I believe to be best adapted for the purposes above described, but I do not confine myself to its use, as other substances having analogous semi-plastic properties, could be used for the same purpose and when so used would be the equivalents of the unvulcanized rubber described as forming part of my improved self-healing tire.

What I claim, and desire to secure by Letters Patent, is—

1. In a pneumatic cycle tire the combination with the main tube, of plies of cloth or other fabric around the same and a layer of unvulcanized rubber extending over and protecting the tread portion of the tube, the same being inclosed in a pocket formed by the separation of said plies of cloth or fabric, substantially as described.

2. A pneumatic cycle tire composed of the following elements: an inner layer of vulcanized rubber, a layer of unvulcanized rubber, plies of sheeting separated to form a recess upon the tread portion of the tire, unvulcanized rubber within said recess, and a layer of vulcanized india rubber, substantially as described.

3. A pneumatic cycle tire composed of the following elements: layers of vulcanized and unvulcanized rubber, plies of sheeting around the same arranged to form a recess upon the tread portion of the tire, unvulcanized rubber within said recess, and a layer of vulcanized india rubber, substantially as described.

4. A pneumatic cycle tire composed of the following elements: an innermost coating of non-adhesive material in contact with an inner layer of unvulcanized rubber, plies of sheeting arranged to form a recess upon the tread portion of the tire, unvulcanized rubber within said recess, and a layer of vulcanized india rubber, substantially as described.

In testimony whereof I have signed this specification in the presence of two subscribing witnesses.

JAMES R. MORRIS.

Witnesses:
W. W. SCOTT,
GEO. A. McDANOLDS.